Patented June 22, 1937

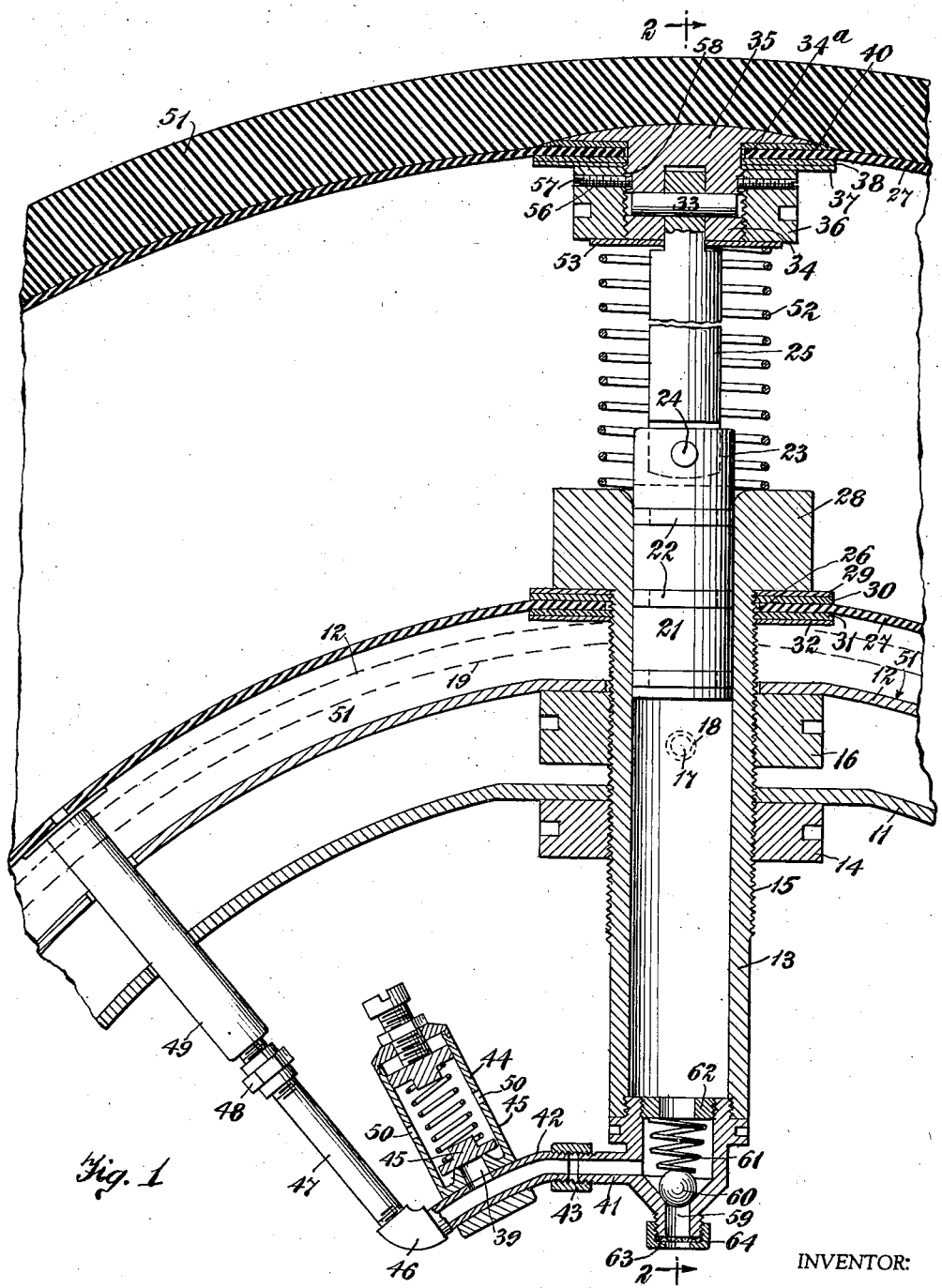

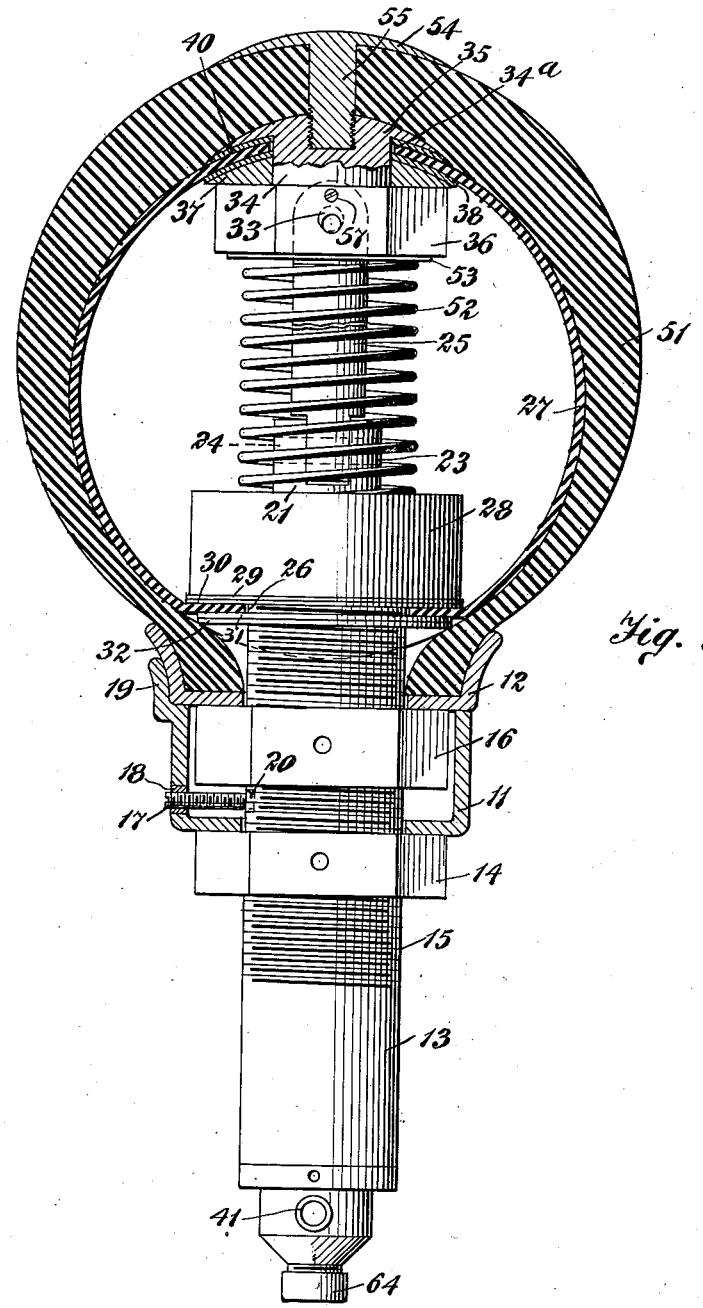

2,084,381

UNITED STATES PATENT OFFICE 2,084,381

AUTOMATIC INFLATER FOR VEHICLE WHEEL TIRES

Nicholas Demarest Campbell, Hackensack, N. J.

Application September 11, 1935, Serial No. 40,121

3 Claims. (Cl. 152—11)

My invention relates to improvements in automatic inflaters for vehicle wheel tires, and it consists in the novel features which are hereinafter described.

One of the objects of my invention is to provide automatic means for inflating pneumatic tires for automobiles and other vehicles while the latter are in motion, whereby to compensate for the leakage of compressed air from the tires which may be caused by punctures or otherwise.

Another object is to initially inflate a tire by the energy of the rolling of the wheels of a vehicle, such as an automobile.

A further object of my invention is to provide a safety valve to act in association with my automatic inflating means, whereby to limit the pressure of the air in the tire.

A still other object is to have my automatic means for inflating pneumatic tires relatively simple, compact and comparatively inexpensive.

Other objects and advantages will hereinafter appear.

I attain these objects by the automatic inflater for pneumatic vehicle wheel tires, illustrated in the accompanying drawings, or by any mechanical equivalent or obvious modification of the same.

In the drawings Fig. 1 is a fragmentary sectional view of my inflater in the plane of the vehicle wheel passing through the axis of the air compressing cylinder of my inflater. Fig. 2 is a view of my inflater partly in elevation and partly in section on the line 2—2 of Fig. 1 in a plane disposed transversely to the plane of a vehicle wheel, which is equipped with my inflater.

Fig. 2 also shows an attachment to my inflater, which is hereinafter described and which may be omitted, if desired.

Similar numerals refer to similar parts throughout the several views:

11 designates the felly of an automobile wheel and 12 the demountable rim of the same.

A cylinder 13 is shown as passing through an opening in the felly 11 and through another opening in the rim 12 and is radially disposed with relation to the wheel.

A nut 14 is shown in engagement with a threaded part 15 on the outer periphery of the cylinder 13, and is abutting at the end thereof against the inner periphery of the felly 11; another nut 16 is also in engagement with the threaded part 15 and is abutting against the inner periphery of the rim 12. The nuts 14 and 16 are keeping the cylinder 13 in position to prevent longitudinal displacement of the cylinder 13.

To provide against rotary displacement of the cylinder 13, I provide a set-screw or pin 17 which passes through a socket 18 in the side or flange 19 of the felly 11 to engage an opening 20 in the wall of the cylinder 13.

A piston or plunger 21, having thereon resilient packing rings 22, is slidably positioned in the interior of the cylinder 13 to reciprocate therein.

The piston 21 terminates at the outer end thereof in a bifurcation 23 which is shown as pivotally connected by means of a pin 24 to the inner end of a connecting rod 25 which is shown as broken away at the middle part thereof, to indicate that connecting rods of different lengths may be employed, if desired, for a purpose which is hereinafter described.

The outer end of the cylinder 13 passes through an opening 26 in the inner periphery of the inner tube 27 of a pneumatic tire and has thereon a flanged head 28, which is disposed interiorly of the said tube 27 and has the inner annular end thereof abutting against a metal washer 29, which is thereby pressed against an annular packing 30, which is interposed between the washer 29 and the inner surface of the inner periphery of the tube 27, whereby leakage is prevented through the opening 26.

Another annular packing 31 is placed in contact with the outer surface of the inner periphery of the tube 27, and another annular metal washer 32 is interposed between the packing 31 and the inner side of the flanges of the shoe 51 which rest on the outer periphery of the rim 12, to protect the inner tube 27 against wear and also to assist in preventing leakage.

The outer end of the rod 25 is pivotally connected by means of a pin 33 to an exteriorly threaded plug 34, which extends inwardly through an opening 34a in the outer periphery of the tube 27 and terminates in a flanged head or plate 35, which is positioned exteriorly to the tube 27.

The pins 24 and 33 are disposed in planes which are perpendicular to each other, whereby the rod 25 is adapted to serve as a universal joint.

A complete universal joint may be provided for each end of the rod 25, if desired.

The plug 34 is in threaded engagement with a nut 36, which abuts against a metal washer 37, which is spaced by means of a packing 38 from the inner surface of the outer periphery of the tube 27, and the washer 37 is pressed by the nut 36 against the packing 38 and the tube 27, whereby leakage of compressed air is prevented through the opening 34a.

The flanged head 35 is spaced from the outer surface of the outer periphery of the tube 27 by means of a packing 40 which is placed between the head 35 and the outer surface of the outer periphery of the tube 27.

All the hereinbefore described packings may be made of sheets of india rubber or some other suitable material.

The packing 40 serves to distribute the pressure of the flange 35 on the outer periphery of the tube 27 and also to prevent leakage through said opening 34a.

As shown in Fig. 1, the flanged head 35 forms the outermost part of my inflater.

As the wheel of an automobile, which is equipped with my inflater, is rolling along on the road the flanged head 35 will receive the reaction from the road through the shoe 51 and transmit it to the connecting rod 25, which in turn will push the piston 21 towards the inner end of the cylinder 13, thereby compressing the air, which is contained in the latter, and discharging it through an opening in a spout 41 at the inner end of the cylinder 13 into the adjacent end of a tube 42 which is curved in part and is shown as connected at one end thereof to the spout 41 by means of a union 43.

The stroke of the piston 21 is limited by the distance between the nut 36 and the head 28; this distance is shown in Fig. 1 as shorter than the length of the interior of the cylinder 13 inwardly of the piston 21 when the latter is in its outermost position.

An air compression space is thereby formed at the inner end of the cylinder; the size of this air compression space determines the highest pressure of the air reached in the cylinder 13.

By employing connecting rods 25 of different lengths, the size of this space may be varied, and with it also the highest pressure of the air reached in the cylinder 13.

A check valve may be placed either in the cylinder adjacent the spout 41 or between the spout 41 and the union 43, the check valve to close by a flow of air towards the cylinder 13 and to open by the flow of air from the cylinder 13 towards the tube 42, whereby to prevent a backflow of air from the tube 42 into the cylinder 13 when the piston 21 is moved outwardly in the cylinder 13.

The tube 42 is shown as extending through the casing 44 of a safety valve 45 and is in communication through an opening 39 in the middle part of the tube 42 with the interior of the casing 44.

The other end of the tube 42 is shown as connected by means of an elbow 46 to the inner end of a nipple 47, which has the outer end thereof connected by means of a union 48 to the valve spout 49 of the inner tube 27.

The safety valve 45 may be of standard construction in all of its parts and appurtenances, and is shown in cross section in Fig. 1.

For a required load on the tire the length of the piston rod 25 may be designed to bring the piston 21 during the longest stroke thereof near enough to the inner end of the cylinder 13 to produce in the latter at the end of the said stroke of the piston a maximum air pressure which is higher than the required air pressure in the tube 27, to provide for a possible reduction in the maximum air pressure in the cylinder, which reduction may be caused by the shortening of the stroke of the piston which may be produced by a decrease in the deflection of the tube 27 as the pressure of the air therein rises.

An excess of pressure may, therefore, be produced in the cylinder 13, which is discharged into the tube 42.

The compressed air from the tube 42 passes through the nipple 47 and valve spout 49 into the inner tube 27, until a desired air pressure is reached, whereupon the compressed air from the tube 42 is passed through the safety valve 45 and discharged through one or more exhaust openings 50 in the casing 44 of the safety valve 45, which is adjusted to exhaust at the desired pressure in the casing 44.

The cylinder 13, the safety valve 45 and spout 49 are all shown as positioned in the same plane and may be located in the space between two adjacent spokes of the wheel, where the space is ample for that purpose.

In small sized wheels where there may not be enough room between any two spokes of the wheel, the cylinder 13 may be placed in a space which is adjacent to that occupied by the valve spout 49, and the safety valve 45 may be placed at the side of a spoke of the wheel which separates the said spaces and in a plane which is parallel to that of the cylinder 13; the ends of the tube 42 may then be suitably bent to connect with the spout 49 and the spout 41 on the cylinder 13; the spout 41 may then be disposed on the cylinder 13 to extend in a suitable direction to meet the corresponding end of the tube 42.

When the head or plate 35 has been rolled by the wheel out of the influence of the road reaction the pressure of the compressed air in the tube 27 will force the head 35 with the plug 34 thereon outwardly into contact with the shoe 51, thereby causing the rod 25 to return the piston 21 to its original position at the outer end of the cylinder 13, thereby causing air to be inspirated into the cylinder 13 through an inlet 59 in the cylinder 13 near the inner end of the latter; the inlet 59 is controlled by a check valve 60, which is actuated by a spring 61, to prevent the escape of air through the inlet 59 during the compression stroke of the piston 21.

The spring 61 is shown as abutting at one end thereof against the valve 60 and at the other end thereof against a collar 62 which is removably placed in the interior of the cylinder 13 near the inner end thereof.

An air strainer 63 is held by a cap 64 at the inlet 59.

For initially inflating the tube 27 the plug 34 may be moved outwardly by a spring 52, which is shown in Fig. 1 as encompassing the rod 25 and is abutting at the outer end thereof against a metal washer 53 which is placed therebetween and the plug 34; the inner end of the spring 52 abuts against the flanged head 28 of the cylinder 13.

The cylinder 13 may also be provided near the inner end thereof with an additional outlet and a petcock or valve for controlling the same, whereby by opening the petcock or valve the air in the cylinder 13 will be discharged through the said outlet during the inward stroke of the piston 21, without being compressed.

This may be desirable when there is no puncture in the tire or any other leakage therefrom.

By using a throttle valve instead of a petcock, the escape of air through the said outlet may be restricted to any desired extent, whereby the amount of air compressed in the cylinder may be regulated and restricted to the amount which may be required to make up for the loss of air from the tire by leakage or otherwise.

By the above devices power of compressing superfluous air may be saved and also the noise of the continuous discharge of compressed air from the safety valve 45 may be avoided.

The spring 52 may be omitted, if desired, and the tube 27 may then be initially filled by compressed air from an external source.

To prevent the inner surface of the shoe 51 from being worn out by the head 35 at the place of contact with the latter, I provide an attachment plate 54 which is shown in Fig. 2 as placed against the outer surface of the shoe 51, to contact with the road; the plate 54 has thereon at the inner side thereof a threaded stem 55, which is shown in Fig. 2 as extending inwardly and in engagement with an interiorly threaded portion of the plug 34, whereby the tube 27 is connected to the shoe 51, and excessive friction is prevented between the head 35 and the inner surface of the shoe 51.

However, the attachment plate 54 with the stem 55 thereon may be omitted, if desired.

To prevent displacement of the nut 36 on the plug 34, I provide in the nut 36 openings 56 to receive therein set-screws or pins 57 which extend into corresponding openings 58 in the plug 34.

Variations are possible and parts of my invention may be used without other parts.

I do not, therefore, restrict myself to the details as shown in the drawings.

I claim as my invention and desire to secure by Letters Patent:

1. A vehicle wheel having thereon a pneumatic tire and automatic means on said wheel for compressing air into the tire during the rolling of the wheel on the road, said means comprising a pair of telescoping members, one of said members being connected to the rim of the wheel, a connecting rod, pivotally connected at one end thereof to the other member, and a flanged tread member pivotally connected to the other end of said rod and secured to the outer periphery of the tire, said pivotal connections being disposed in planes which are substantially at right angles to each other, thereby enabling said tread member to conform to the inequalities of the road.

2. A vehicle wheel having thereon a pneumatic tire, comprising a shoe and an inner tube in said shoe, and automatic means on said wheel for compressing air into the said tube during the rolling of the wheel on the road, combined with a road contact plate on the outer periphery of said shoe, operatively connected to said air compressing means.

3. A vehicle wheel having thereon a pneumatic tire, comprising a shoe and an inner tube in said shoe, and automatic means on said wheel for comprising air into the said tube during the rolling of the wheel on the road, a flanged member secured to the outer periphery of the said tube, means to prevent leakage of compressed air between said member and said tube, and a road contact plate on the outer periphery of said shoe, connected to said member, whereby to prevent the wearing away of the inner surface of said shoe by said member.

NICHOLAS DEMAREST CAMPBELL.